United States Patent [19]
Futagawa et al.

[11] Patent Number: 5,706,937
[45] Date of Patent: Jan. 13, 1998

[54] FLEXIBLE DUAL-CHAMBERED CONTAINER

[75] Inventors: Hitoshi Futagawa; Noriyoshi Yamamoto, both of Kusatsu; Masanobu Iwasa, Osaka-fu, all of Japan

[73] Assignee: Nissho Corporation, Osaka, Japan

[21] Appl. No.: 617,162

[22] Filed: Mar. 18, 1996

[30] Foreign Application Priority Data

Apr. 11, 1995 [JP] Japan .................................. 7-085275

[51] Int. Cl.⁶ .................................................. B65D 81/32
[52] U.S. Cl. .................... 206/221; 206/484.2; 383/109; 604/410
[58] Field of Search ......................... 206/219, 221, 206/222, 568, 484, 484.1, 484.2; 383/109; 604/410, 416

[56] References Cited

U.S. PATENT DOCUMENTS

| | | |
|---|---|---|
| 3,608,709 | 9/1971 | Pike . |
| 3,679,509 | 7/1972 | Fielibert . |
| 3,983,994 | 10/1976 | Wyslotsky . |
| 4,402,402 | 9/1983 | Pike ................................ 206/219 |
| 4,861,632 | 8/1989 | Caggiano ......................... 383/109 |
| 5,129,894 | 7/1992 | Sommermeyer et al. ........ 604/410 |
| 5,176,634 | 1/1993 | Smith et al. ..................... 206/219 |
| 5,267,646 | 12/1993 | Inoue et al. ..................... 206/219 |
| 5,423,421 | 6/1995 | Inoue et al. ..................... 206/219 |
| 5,462,526 | 10/1995 | Barney et al. ................... 604/416 |

*Primary Examiner*—Paul T. Sewell
*Assistant Examiner*—Luan K. Bui
*Attorney, Agent, or Firm*—Kubovcik & Kubovcik

[57] ABSTRACT

A flexible and dual-chambered container includes a first frontal sheet fusion bonded to a first rear sheet to define a first chamber for containing, for example, a medical liquid. The first frontal sheet is a flexible and transparent sheet for intercepting water, moisture, and oxygen gas. The first rear sheet is a flexible composite sheet composed of aluminum foil and a water-absorbing stratum. A second frontal sheet is fusion bonded to a second rear sheet to define a second chamber for containing, for example, a medical liquid. The second frontal and rear sheets are joined to the first frontal and rear sheets so that the first and second chambers are isolated by a breakable or weak seal. An opaque and flexible cover sheet composed of aluminum foil is removably disposed on the first frontal sheet. When the weak seal is broken by manually compressing the second chamber, the first and second chambers are brought into liquid communication. Any residual amount of water or vapor can be eliminated from the container during manufacturing so that the dry drug contained therein is protected from oxygen, water, and light beams.

5 Claims, 3 Drawing Sheets

FLEXIBLE DUAL-CHAMBERED CONTAINER

BACKGROUND OF THE INVENTION

1. Field of the Invention

The present invention relates to containers and, more particularly, to a flexible dual-chambered container designed to hold a medical liquid and a dry medical material in separate chambers so that the liquid and the dry material can be intermixed on demand.

2. Prior Art

Conventional dual-chambered containers for medical uses are flexible and have a partition dividing the interior of the container into chambers. The chambers of the container are brought into fluid communication with each other by breaking the partitions. One disadvantage of these containers is that small amounts of water vapor and/or gases can permeate through the partitions, which are made of a synthetic resin. In the case where a hygroscopic and unstable drug such as an antibiotic is held in one chamber and a solvent or diluent is held in the other chamber, even very small "interchamber" permeations of water or gases are problematic. Further, an amino acid solution such as a tryptophan solution is so susceptible to oxidation that interchamber permeation can cause problems when such solution and a sucrose or protein solution are accommodated in the same container. Thus, an effective countermeasure for preventing water vapor or oxygen gas from penetrating the partition and affecting the drug has been needed (as proposed, for example, in Japanese Patent Publication No. 63-20550). In one proposal, an external bag accommodating the drug and the liquid together with a desiccant or deoxidant is made of an impermeable material that intercepts water vapor and oxygen gas. The desiccant, however, absorbs water from the liquid so that the hygroscopic drug cannot be dehydrated, with the liquid being condensed to an undesirable extent. In another proposal intended to resolve this drawback, the chamber for receiving the hygroscopic or readily oxidizing drug is covered with an external wall through which water vapor and oxygen gas cannot permeate. The desiccant and/or deoxidant are sandwiched between the external wall and the chamber wall, and an inert gas and/or dry gas may be trapped in the external wall (as disclosed in Japanese Unexamined Patent Publication Nos. 4-364850, 4-364851, and 6-14975). A further proposal (as disclosed in Japanese Domestic Laid-Open Gazette No. 5-509025 of an International Patent Application) offers a flexible multi-chambered container including a diluent chamber and a drug chamber. This container may comprise a rear sheet for shutting out water vapor and/or a cover sheet intercepting moisture and separably attached to a frontal sheet.

Each of the prior art containers suffers from the disadvantage that it is difficult to keep the container free of water, during manufacture thereof. After manufacture, water vapor and oxygen gas tend to permeate through the wall of each container. Thus, during long-term storage, the dry drug held in each container has necessarily deteriorated. In light of this problem, some containers such as disclosed, for example, in the above-mentioned Japanese Patent Publication No. 4-364850, include an outer bag wrapping the container. Such a "double wrapping" itself and the desiccant embedded between the outer bag and container wall require additional manufacturing steps and labor and, consequently, the manufacturing process is rendered more intricate and expensive. For visual confirmation of the drug stored in one chamber, the prior art containers have been made from a transparent sheet. As a result, these containers must be kept in a dark place to prevent light beams transmitted through the container wall from deteriorating the drug over the course of time.

SUMMARY OF THE INVENTION

In view of the problems mentioned above, an object of the present invention made is therefore to provide a flexible and dual-chambered container including at least two chambers which can be readily manufactured without introducing water and/or moisture into a chamber for receiving a dry drug and which can protect a drug contained therein from oxygen, water, and light beams.

In accordance with the present invention, the flexible and dual-chambered container includes a first frontal sheet fusion bonded to a first rear sheet to define a first chamber. The first frontal sheet is a flexible, transparent sheet for intercepting water, moisture, and oxygen gas. The first rear sheet is a flexible composite sheet comprised of aluminum foil and a water-absorbing stratum. A second frontal sheet is fusion bonded to a second rear sheet to define a second chamber. The second frontal and rear sheets are joined to the first frontal and rear sheets so that the first and second chambers are isolated by a breakable seal. An opaque and flexible cover sheet comprised of aluminum foil is removably disposed on the first frontal sheet.

In a preferred embodiment, the first chamber contains a dry drug and the second chamber contains a medical liquid. Preferably, the first rear sheet of the first chamber includes an outer layer, an intermediate layer, and an inner layer. The outer layer may be made of polyethylene terephthalate, with the intermediate layer being composed of aluminum foil and a water-absorbing stratum. The inner layer may be made of a polyolefin. The first frontal sheet of the first chamber preferably includes an outer layer and an inner layer. The outer layer of the first frontal sheet may be made of polyethylene terephthalate and lined with a silica stratum, with the inner layer also being made of a polyolefin. On the other hand, the cover sheet removably disposed on the first frontal sheet preferably includes an outer layer of polyethylene terephthalate, an inner adhesive layer, and an intermediate layer comprised of aluminum foil. This intermediate layer may additionally include a water-absorbing stratum disposed inside the aluminum foil.

Alternatively, both the layers of the first frontal sheet forming the first chamber may be made of a polymer blend composed of two polyolefins that have a limited affinity to, i.e., poor compatibility with, each other. An intermediate layer coated with silica may intervene between the outer layer and the inner layer. In addition, a polyolefin substratum may be substituted for the inner adhesive layer forming the cover sheet. This stratum can be welded at a low temperature to the first frontal sheet so that it is removable therefrom.

In use, when the liquid-containing chamber is compressed by hand to open the breakable seal, this chamber is brought into liquid communication with the chamber containing the dry drug. The aluminum foil and the water-absorbing stratum in the flexible rear sheet and the frontal sheet of the chamber containing the dry drug, which is covered with an opaque cover sheet, act to intercept water and oxygen gas and to shut out light beams. Therefore, any external oxygen gas and moisture as well as light beams are shut out of the drug-containing chamber, until the liquid-containing chamber is compressed to open the breakable seal and intermix the dry drug and the medical liquid. Further, any residual water within the drug-containing chamber is exhausted during manufacture of the container. The dry drug accommodated in the container of the invention is thus protected from deterioration that would otherwise be caused by oxygen, water, and light beams. Residual oxygen gas remaining in the drug-containing chamber does not attack the drug because the atmosphere therein is free of moisture.

DETAILED DESCRIPTION OF THE PREFERRED EMBODIMENTS

Figure 1:
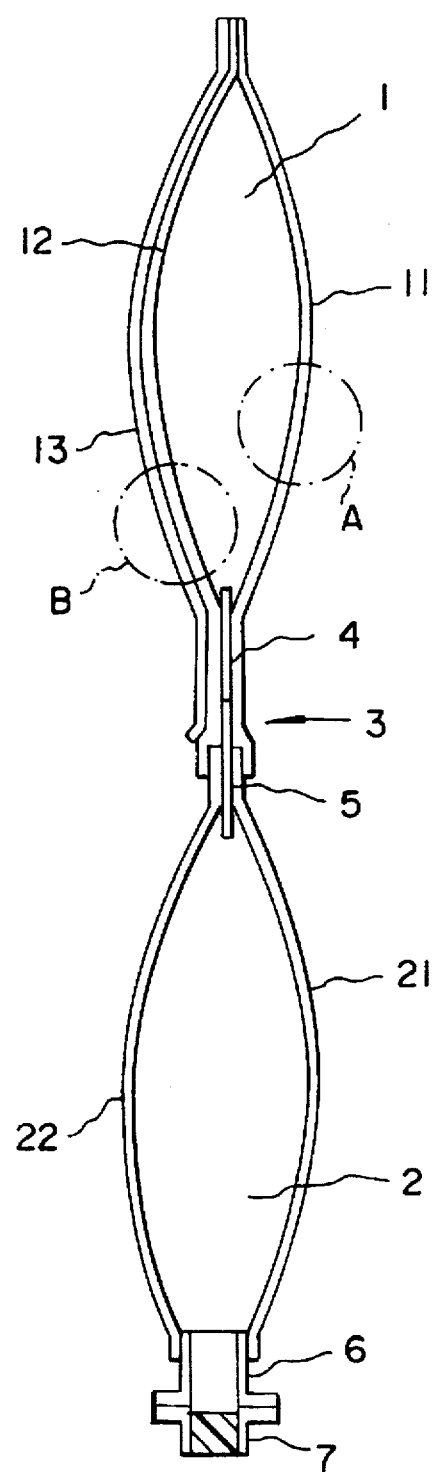
FIG. 1 is a cross section of a container in accordance with a first preferred embodiment of the present invention.

Preferred embodiments of the present invention will now be described with reference to the accompanying drawings.

The flexible dual-chambered containers shown in FIGS. 1 to 6 include a number of common elements including a first chamber 1 for receiving a dry drug (not shown) and a second chamber 2 for receiving a medical liquid (not shown). A breakable or weak seal 3 forms a liquid-tight seal which isolates chambers 1 and 2 from each other. The first chamber 1 is defined by and between a rear sheet 11 and a transparent frontal sheet 12, both of which sheets are flexible. The rear sheet 11 has an intermediate layer composed of aluminum foil 112 and a water-absorbing stratum 113 (see FIG. 2). The frontal sheet 12 shuts water and oxygen gas out of the first chamber. An opaque cover sheet 13 has an intermediate layer composed of aluminum foil 132 (see FIGS. 3 and 5) and is removably attached to the whole surface of the frontal sheet 12. The reference numerals 6 and 7 denote a port and a plug, respectively.

In the first preferred embodiment shown in FIG. 1, rear sheet 11 and frontal sheet 12 forming first chamber 1 have a weak seal formed in one side thereof. Rear sheet 21 and frontal sheet 22 forming second chamber 2 also have a weak seal formed in one side thereof. The weak seal 3 is formed by bonding the respective sides having the weak seals therein to one another. Cover sheet 13 removably adheres to frontal sheet 12 of the first chamber 1. The side of rear sheet 11 and frontal sheet 12 forming the first chamber includes a tongue 4 sandwiched between and fusion bonded to the rear and frontal sheets 11 and 12, respectively. The side of rear sheet 21 and frontal sheet 22 forming the second chamber includes a tongue 5 sandwiched between and fusion bonded to the rear and frontal sheets 21 and 22, respectively.

Figure 2:
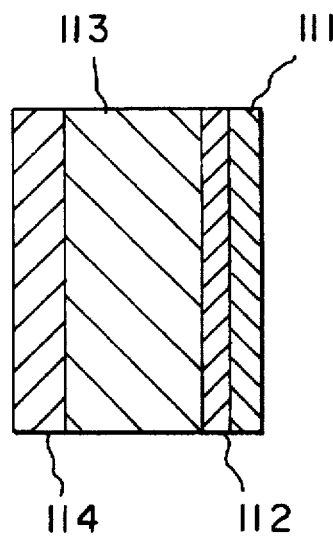
FIG. 2 is an enlarged cross section of the encircled region "A" in FIG. 1.

As shown in FIG. 2, rear sheet 11 is an aluminum foil laminate having water-absorbing layer 113. This laminate is sandwiched between an outer layer 111 of polyethylene terephthalate (PET) and an inner layer 114 of polyethylene (PE). Thus, the composition of the rear sheet may be represented by the symbol "PET/Al foil/H$_2$O-absorbent/PE." The aluminum foil will shut out not only oxygen gas and water but also light beams. Even in the event fine pin holes are present in aluminum foil 112, any water passing through the pin holes will be captured by water-absorbing stratum 113. Because water or moisture and light beams are shut out of the first chamber in this way, any residual oxygen present therein does not deteriorate the dry drug held in the chamber. A preferred example of the water-absorbing stratum 113 is a polyethylene sheet containing an inorganic filler, such as DRY-KEEP PE-30 (trademark) made by Sasaki Kagaku Yakuhin Co., Ltd.

As described above, frontal sheet 12 of first chamber 1 is a transparent flexible laminate which shuts water and oxygen gas out of the first chamber. This sheet 12 is composed of an outer layer 121 and an inner layer 122. The outer layer 121 is a polyethylene terephthalate film coated with silica, with the inner layer 122 being a polyethylene film. Thus, the composition of the frontal sheet may be represented by the symbol "silica-coated PET/PE."

Figure 3:
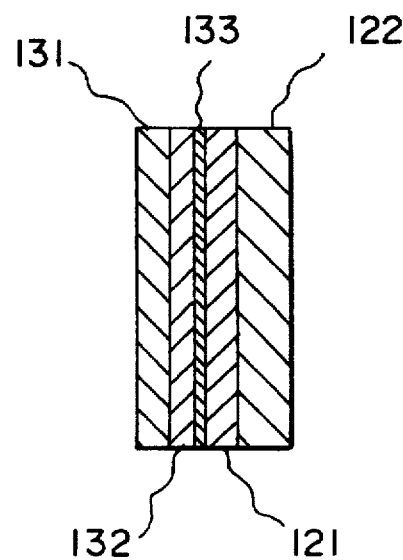
FIG. 3 is an enlarged cross section of the encircled region "B" in FIG. 1.

It is preferred that cover sheet 13 is a flexible laminated comprised of aluminum foil 132 sandwiched between a polyethylene terephthalate outer layer 131 and an adhesive inner layer 133, as shown in FIG. 3. The cover sheet prevents water or moisture, oxygen gas, and light beams from entering the first chamber 1. This cover sheet 13 may be pressed to the frontal sheet 12 so that it will not unintentionally peel therefrom. If desired, a water-absorbing stratum (not shown) may be added to intervene between the aluminum foil 132 and inner layer 133. Similar to layer 113 of rear sheet 11, this additional stratum would capture any water which enters the chamber through fine pin holes undesirably present in aluminum foil 132.

The tongues 4 and 5 forming the weak seal are made of a resinous material that exhibits poor bonding strength when fusion bonded to polyethylene forming the inner layers of the rear and frontal sheets 11 and 12, respectively. For example, the resinous material may be a polymer blend of polyethylene with a plastic, for example, polypropylene, that has a limited affinity to polyethylene. The blend ratio of polyethylene to polypropylene is preferably in a range from 3:7 to 7:3. On the other hand, both the rear and frontal sheets 21 and 22 of the second chamber 2 are made of polyethylene.

Figure 4:
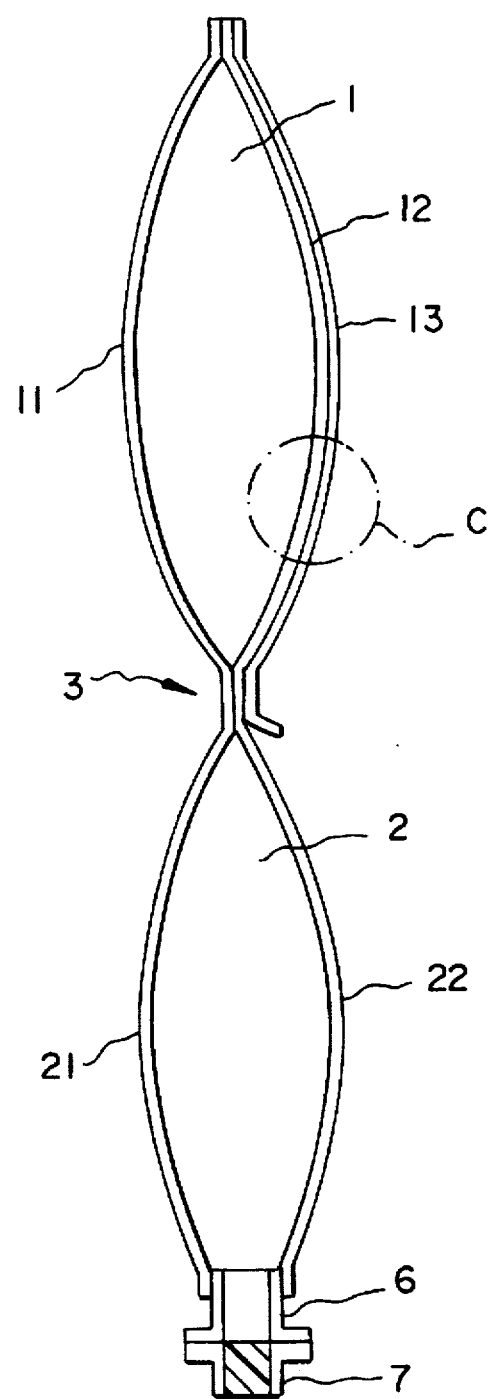
FIG. 4 is a cross section of a container in accordance with a second preferred embodiment of the present invention.

FIG. 4 shows a flexible dual-chambered container in accordance with a second preferred embodiment of the present invention. In this container, rear sheet 11 of the first chamber 1 continues to and is integral with rear sheet 21 of the second chamber 2. Thus, rear sheets 11 and 21 are formed of a single sheet. Similarly, frontal sheet 12 of first chamber 1 smoothly extends to the second chamber to thereby form frontal sheet 22 thereof. Thus, frontal sheets 12 and 22 also are formed of a single sheet. The rear and frontal sheets 11 and 12, respectively, are laid one on another and then fusion bonded together at high temperature along three peripheral sides of the sheets. Likewise, rear and frontal sheets 21 and 22, respectively, are laid one on another and then fusion bonded together at high temperature along three peripheral sides of the sheets. The remaining, unjoined side of sheets 11 and 12 and the remaining, unjoined side of sheets 21 and 22 are then fusion bonded at a lower temperature so as to define the first and second chambers 1 and 2, respectively, and thereby provide a breakable, weak seal therebetween. In this case, cover sheet 13 is fusion bonded to frontal sheet 12 of the first chamber for receiving a dry drug.

Similar to the container shown in FIG. 1, the rear sheet 11 of the first chamber is a flexible aluminum foil laminate having water-absorbing stratum 113. However, the inner layer of this rear sheet (as illustrated in FIG. 2) is formed of a polymer blend of polyethylene with polypropylene. Thus, the composition of the rear sheet may be represented by the symbol "PET/Al foil/H₂O-absorbent/PE-PP blend."

Figure 5:
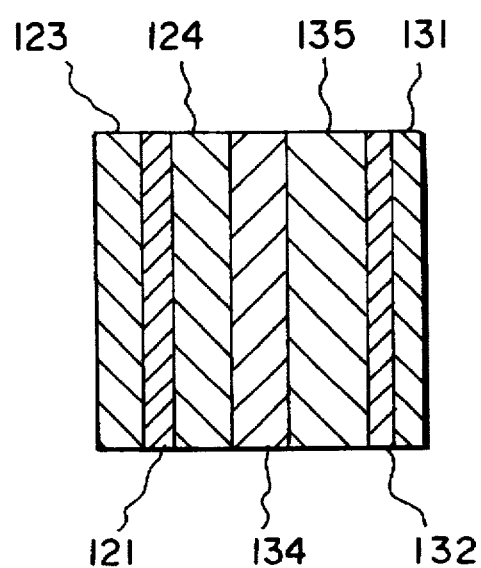
FIG. 5 is an enlarged cross section of the encircled region "C" in FIG. 4.

In the case where the cover sheet 13 has the composition shown in FIG. 5 and represented by the symbol "PET (12 μm thick)/aluminum foil (9 μm thick)/PE or PP (as an inner layer)," it is preferred that the frontal sheet for first chamber 1 has the composition represented by the symbol "PE-PP blend/silica-coated PET/PE-PP blend." The inner and outer layers of this frontal sheet are denoted by the reference numerals 123 and 124, respectively, in FIG. 5. In the case where the cover sheet includes an inner adhesive layer 133 as shown in FIG. 3, the outer layer 124 of the PE-PP blend can be dispensed with. Consequently, an outer sheet composed of "silica-coated PET/PE-PP blend" as shown in FIG. 3 is preferred. If desired, water-absorbing stratum 135 may be added to cover sheet 13 and disposed inside aluminum foil 132.

Rear sheet 11 is fusion bonded to frontal sheet 12 in such a manner that a weak seal is formed between the first and second chambers and a rigid seal is formed along peripheral sides of each chamber. If the inner layer of rear sheet 11 as well as the inner layer 123 of frontal sheet 12 are formed of a blend of polyethylene with polypropylene, then the fusion bonding for providing the weak seal is done at a low temperature of about 120° C. The fusion bonding of the peripheral zones can be done at a higher temperature of about 200°–250° C.

Figure 6:
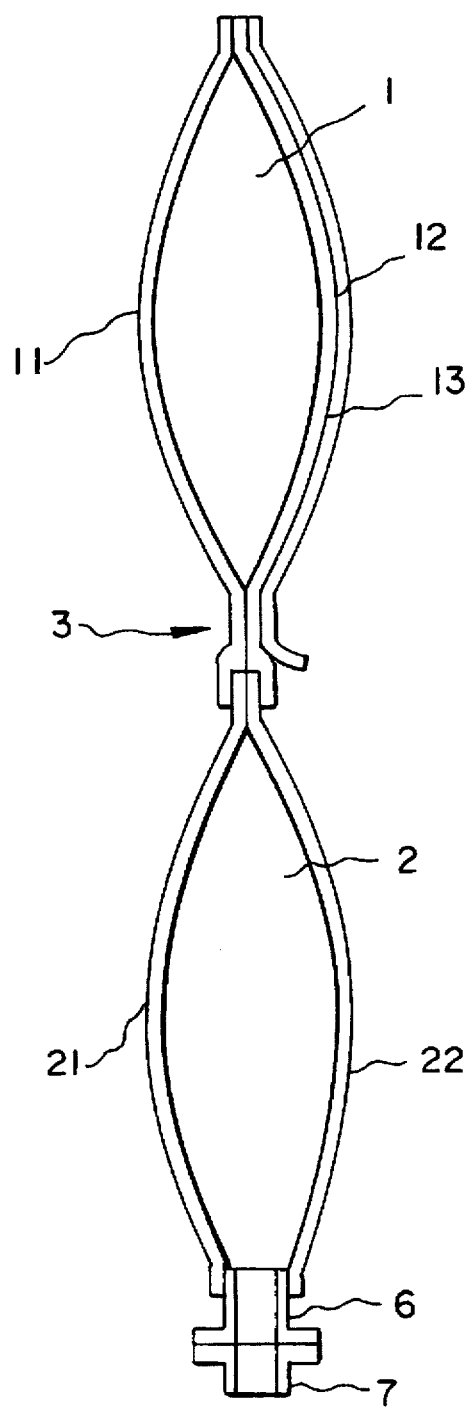
FIG. 6 is a cross section of a container in accordance with a third preferred embodiment of the present invention.

In the third preferred embodiment shown in FIG. 6, both the first chamber 1 for dry drug and the second chamber 2 for the medical liquid have a weak seal formed in one side thereof. A readily breakable weak seal 3 is formed by fusion bonding together such weak-sealed sides. Frontal sheet 12 is also provided with cover sheet 13 that can be easily separated therefrom. The fusion bonding of the chambers to one another may be carried out, for example, by inserting the second chamber's weak seal portion into an unsealed portion of the first chamber and then hot pressing these portions to finish the fusion bond.

The rear sheets 11 and 21 of chambers 1 and 2 must be inseparably joined to one another, with the frontal sheets 12 and 22 thereof also being inseparably sealed at their peripheries. Therefore, the inner layer of rear sheet 11 of first chamber 1 is formed of the same material as that of which the outer layer of rear sheet 21 of second chamber 2 is formed. Further, the inner layer of frontal sheet 12 must be formed of the same material as that of which the outer layer of frontal sheet 22 is formed.

In detail, rear sheet 11 of first chamber 1 for the dry drug is also a flexible aluminum foil laminate having water-absorbing stratum 113. As shown in FIG. 2, the outer layer 111 is formed of polyethylene terephthalate (PET), with the inner layer 114 being formed of polyethylene. Thus, the composition of this rear sheet may be represented by the symbol "PET/Al foil/H₂O absorbent/PE."

Frontal sheet 12 is a transparent and flexible laminate for intercepting water and oxygen gas. As shown in FIG. 6, the weak-sealed side of second chamber 2 is inserted in and secured to an unsealed side of first chamber 1 to join the chambers and provide an integral container. For this purpose, frontal sheet 12 may include an outer layer 121 of silica-coated polyethylene terephthalate, and an inner layer 122 of polyethylene. Thus, the composition of this frontal sheet may be represented by the symbol "silica-coated PET/PE." Alternatively, the frontal sheet may include inner and outer layers both formed of a blend of a polyethylene with polypropylene, in which case the composition of the frontal sheet may be represented by the symbol "PE-PP blend/silica-coated PET/PE-PP blend."

Cover sheet 13 in the third preferred embodiment is also a flexible laminate having aluminum foil 132. The structure of cover sheet 13 and frontal sheet 12 may be as shown in FIGS. 3 or 5.

On the other hand, rear sheet 21 of the second chamber for the medical liquid may be a polyethylene sheet, or a laminate having a polyethylene outer layer and a PE-PP blend inner layer.

In the case where rear sheet 21 is polyethylene, frontal sheet 22 of the second chamber may be a laminate having a polyethylene outer layer and a PE-PP blend inner layer. Alternatively, in the case where the rear sheet is a laminate having a polyethylene outer layer and a PE-PP blend inner layer, the frontal sheet 22 may be a polyethylene sheet.

EXAMPLE 1

A dual-chambered container as illustrated in FIG. 1 was manufactured, wherein the rear sheet 11 was a laminate including layers of: PET (12 μm thick); aluminum foil (9 μm thick); water-absorbent stratum (50 μm thick); and PE (20 μm thick), overlaid one on another in this order. The frontal sheet 12 was also a laminate including layers of: silica-coated PET (12 μm thick); and PE (20 μm thick). The cover sheet 13 was composed of layers of: PET (12 μm thick); aluminum foil (9 μm thick); and an adhesive layer. This container was left in an atmosphere having a temperature of 60° C. and a relative humidity of 75%, for four weeks. Water content (in wt %) as well as medical factor (μg/mg, i.e., the content of medically effective component in the drug) of the dry drug contained in the first chamber were measured at the beginning of the test and at one week, two weeks, and four weeks thereafter. The test results are listed in Tables 1 and 2, respectively. As can be seen in Table 2, there was not found any significant or adverse difference between EXAMPLE 1 and REFERENCE, with respect to the medical factor. In the REFERENCE, the drug was contained in a glass vial.

TABLE 1

| (Water content in wt %) | | | | |
|---|---|---|---|---|
| | Beginning | 1 Week | 2 Weeks | 4 Weeks |
| Example 1 | 0.81 | 0.30 | 0.31 | 0.25 |
| Example 2 | 0.75 | 0.25 | 0.23 | 0.19 |
| Reference | 0.73 | 0.49 | 0.58 | 0.47 |

TABLE 2

| (Medical factor in μg/mg) | | | | |
|---|---|---|---|---|
| | Beginning | 1 Week | 2 Weeks | 4 Weeks |
| Example 1 | 945 | 941 | 936 | 934 |
| Example 2 | 947 | 943 | 940 | 936 |
| Reference | 941 | 938 | 936 | 928 |

The drug employed in this test was CEFAZOLIN SODIUM (trademark) and its medical factor was determined by the "cylinder-plate" method.

EXAMPLE 2

Another dual-chambered container as illustrated in FIG. 4 was manufactured, wherein the rear sheet 11 was a laminate including layers of: PET (12 μm thick); aluminum foil (9 μm thick); water-absorbing stratum (50 μm thick); and PE (20 μm thick), overlaid one on another in this order. The frontal sheet 12 was also a laminate including layers of: PE-PP blend (20 μm thick); silica-coated PET (12 μm thick); and PE-PP blend (20 μm thick). The cover sheet 13 was composed of layers of: PET (12 μm thick); aluminum foil (9 μm thick); water-absorbent stratum (30 μm thick); and PE or PP (20 μm thick). This container was tested in the same manner as in EXAMPLE 1, yielding results as listed in Tables 1 and 2. As can be seen in Table 2, there was not found any significant difference between EXAMPLE 2 and REFERENCE, with respect to the medical factor of the drug CEFAZOLIN SODIUM employed in the test. In REFERENCE, the drug was contained in a glass vial.

REFERENCE

The drug CEFAZOLIN SODIUM was contained in a glass vial and subjected to the test described above. The test results are shown in Tables 1 and 2, together with the test results for EXAMPLES 1 and 2.

The medical factor of the drug showed no significant difference between REFERENCE and EXAMPLES 1 and 2. However, the increase in water content was larger in REFERENCE than in EXAMPLES 1 and 2. This advantage is believed to result from the water-absorbent stratum that was employed in the dual-chambered containers manufactured in accordance with the present invention.

It will now be apparent that the dual-chambered container provided by the present invention is capable of intercepting oxygen gas, water, and light beams during storage of the dry drug. The water-absorbing stratum included in the rear sheet acts to absorb residual water or moisture remaining in the chamber for receiving the dry drug during manufacture of the container. Therefore, the drug contained in the chamber will be protected from deterioration even if stored for a long period of time.

What is claimed is:

1. A flexible and dual-chambered container comprising:

a first frontal sheet fusion bonded to a first rear sheet to define a first chamber, said first frontal sheet being comprised of an outer layer, an inner layer, and a silica-coated intermediate layer, both the outer and inner layers being comprised of a polymer blend of two polyolefins having a limited affinity to each other, and said first rear sheet being a flexible composite sheet comprised of aluminum foil and a water-absorbing stratum;

a second frontal sheet fusion bonded to a second rear sheet to define a second chamber, said second frontal and rear sheets being joined to said first frontal and rear sheets so that said first and second chambers are isolated by a breakable seal; and an opaque and flexible cover sheet removably disposed on said first frontal sheet, said cover sheet being comprised of a polyethylene terephthalate outer layer, a polyethylene inner layer, and an intermediate layer comprised of aluminum foil.

2. The container of claim 1, wherein the first rear sheet is comprised of a polyethylene terephthalate outer layer, a polyolefin inner layer, and an intermediate layer comprised of aluminum foil and the water-absorbing stratum.

3. The container of claim 1, wherein the intermediate layer of the cover sheet further comprises a water-absorbing stratum disposed inside the aluminum foil.

4. The container of claim 1, wherein the first chamber contains a dry drug and the second chamber contains a medical liquid.

5. The container of claim 1, wherein the first and second frontal sheets are formed of a single sheet, and the first and second rear sheets are formed of a single sheet.

* * * * *